United States Patent
Jia et al.

(10) Patent No.: US 12,013,802 B2
(45) Date of Patent: Jun. 18, 2024

(54) METHOD AND APPARATUS FOR EMBEDDED PROCESSOR TO PERFORM FAST DATA COMMUNICATION, AND STORAGE MEDIUM

(71) Applicant: SUZHOU CENTEC COMMUNICATIONS CO., LTD., Jiangsu (CN)

(72) Inventors: Fushan Jia, Jiangsu (CN); Jicun Zhang, Jiangsu (CN)

(73) Assignee: SUZHOU CENTEC COMMUNICATIONS CO., LTD., Jiangsu (CN)

( * ) Notice: Subject to any disclaimer, the term of this patent is extended or adjusted under 35 U.S.C. 154(b) by 29 days.

(21) Appl. No.: 17/771,507

(22) PCT Filed: Oct. 22, 2020

(86) PCT No.: PCT/CN2020/122890
§ 371 (c)(1),
(2) Date: Apr. 25, 2022

(87) PCT Pub. No.: WO2021/078197
PCT Pub. Date: Apr. 29, 2021

(65) Prior Publication Data
US 2022/0365893 A1 Nov. 17, 2022

(30) Foreign Application Priority Data
Oct. 23, 2019 (CN) .......................... 201911009338.2

(51) Int. Cl.
G06F 13/28 (2006.01)
(52) U.S. Cl.
CPC .......... *G06F 13/28* (2013.01); *G06F 2213/28* (2013.01)

(58) Field of Classification Search
CPC ...... G06F 13/28; G06F 2213/28; G06F 13/32; G06F 13/1668; G06F 13/14; G06F 13/34
See application file for complete search history.

(56) References Cited

U.S. PATENT DOCUMENTS 5,045,993 A * 9/1991 Murakami ............ G06F 9/3877
711/149
7,877,524 B1 * 1/2011 Annem ................... G06F 13/28
710/22

(Continued)

FOREIGN PATENT DOCUMENTS

| CN | 101556565 A | 10/2009 |
| CN | 101558396 A | 10/2009 |

(Continued)

OTHER PUBLICATIONS

International Search Report for corresponding application PCT/CN2020/122890 filed Oct. 22, 2020; Mail date May 6, 2021.

(Continued)

*Primary Examiner* — Farley Abad
*Assistant Examiner* — Richard B Franklin
(74) *Attorney, Agent, or Firm* — Samson G. Yu

(57) ABSTRACT

A method and an apparatus for an embedded processor to perform fast data communication, and a storage medium are provided. The method comprises: dividing an internal memory into multiple on-chip storage units sequentially assigned with consecutive addresses; configuring a memory interface controller connected to the internal memory, the memory interface controller comprising multiple memory interface control units; configuring an on-chip processor and a DMA controller respectively connected to the memory interface controller, the DMA controller comprising multiple request allocation units in one-to-one correspondence with the memory interface control units; configuring a dedicated functional module connected to the DMA con- (Continued)

troller, and in a case where the on-chip processor and the DMA controller perform a read and/or write request, the memory interface control unit matches a corresponding on-chip storage unit, so as to read and/or write data in the internal memory, and returns the read data to an original request module.

20 Claims, 3 Drawing Sheets

(56) References Cited

U.S. PATENT DOCUMENTS

| | | | |
|---|---|---|---|
| 11,301,295 B1* | 4/2022 | Gupta | G06F 13/28 |
| 2012/0246379 A1* | 9/2012 | Kelleher | G06F 12/0607 |
| | | | 711/E12.084 |
| 2018/0357190 A1 | 12/2018 | Han et al. | |

FOREIGN PATENT DOCUMENTS

| | | |
|---|---|---|
| CN | 104820657 A | 8/2015 |
| CN | 109308283 A | 2/2019 |
| CN | 110737618 A | 1/2020 |
| WO | 2018120010 A1 | 7/2018 |

OTHER PUBLICATIONS

CN Search Report for corresponding application 201911009338.2 filed Oct. 23, 2019.

* cited by examiner

--Prior Art--

--Prior Art--

METHOD AND APPARATUS FOR EMBEDDED PROCESSOR TO PERFORM FAST DATA COMMUNICATION, AND STORAGE MEDIUM

CROSS REFERENCE

This application is a National Stage Filing of the PCT International Application No. PCT/CN2020/122890 filed on Oct. 22, 2020, which claims priority to Chinese Application No. 201911009338.2, filed on Oct. 23, 2019, and entitled "Method and Apparatus for Embedded Processor to Perform Fast Data Communication, and Storage Medium", the disclosure of which is hereby incorporated by reference in its entirety.

TECHNICAL FIELD

The present disclosure belongs to the technical field of integrated circuit design, and mainly relates to a method and an apparatus for an embedded processor to perform fast data communication, and a storage medium.

BACKGROUND

In the design of a System on a Chip (SoC) of an embedded processor (e.g., a Central Processing Unit (CPU)), other parts except CPU mostly adopt logics of dedicated functional units. The CPU is responsible for common functions such as configurations of data processing and chip operation, but does not have sufficient processing capability for a large amount of data. The dedicated functional units can achieve rapid processing of a large amount of data in a hardware manner. Thus, there is a demand for data communication (exchange) between the CPU and the described dedicated functional units, and as the supported functions become increasingly complex, the amount of data to be exchanged increases.

In a conventional design solution, data communication between the dedicated functional unit and the processor is completed by active read and/or write operations of the processor. Specifically, the dedicated functional unit writes data to be exchanged into an internal data buffer, and the processor collects the data by means of a common read operation and writes the data into a memory of the processor. When the processor needs to send data to the dedicated functional unit, the processor directly writes data into a data buffer in the dedicated functional unit, and then notifies the dedicated functional unit. In the described implementation solution, the processor needs to participate in all the data processing, which greatly increases the burden of the processor, and when the amount of the data is large, the other operations of the processor will be greatly affected, and even the requirements of practical applications cannot be satisfied.

On the basis of the defects of the described solution, many new technologies have emerged, and there are mainly the following two implementation solutions.

As shown in FIG. 1, in solution 1, data exchange is achieved by Direct Memory Access (DMA) processing, and a DMA controller is added between a processor and dedicated functional units. The processor is only responsible for configuring the DMA controller, and a specific data migration operation is completed by the DMA controller, which greatly reduces the burden of the processor when a large amount of data is exchanged. In this implementation, the DMA controller is connected to a system bus of the processor, and accesses the memory space of the processor directly through the bus, and executes read and/or write operations on the memory space, thereby completing data collection and sending. As the system bus adopts a sharing mechanism, there are other master devices on the system bus which initiate requests.

During the implementation of solution 1, the processor does not need to read and/or write data from the dedicated functional units, and only needs to configure the DMA controller, and the specific data migration operation is completed by the DMA controller. Correspondingly, during implementation of this technology, the processor is not required to perform read and/or write operations of a large amount of data, which can greatly reduce the burden of the processor. However, during the implementation of solution 1, the DMA controller and the processor share the system bus, and thus the DMA operation necessarily occupies the data transmission bandwidth of the system bus, resulting in low processing efficiency of the entire system, particularly when the DMA operation involves a large amount of data, the influence on the processing efficiency is more obvious.

As shown in FIG. 2, solution 2 is implemented by using a mechanism of a shared memory. In this implementation, as the processor is embedded, a part of memory space is surely provided on the chip for the processor. Dedicated functional units share the memory space, and data transceiving operations of the processor can be achieved. Specifically, a shared memory space which can be read and written by both the processor and the dedicated functional units is provided on the chip, and when the processor sends data to the dedicated functional units, the data is first written into the shared memory space, and a memory state flag bit is added for flagging the state of the data in the current memory, based on which the dedicated functional units can make a determination when reading corresponding data; and then the dedicated functional units are notified of reading the data from a designated location through an interrupt or state flag register. When the dedicated functional units send data to the processor, similar operations are performed.

In solution 2, as the processor and the dedicated functional units have a shared memory, regarding a data exchange operation, a sending end only needs to execute a write operation, and a receiving end executes a read operation, thereby reducing the number of times of reading and writing data, and increasing the efficiency of data processing. However, in this solution, each data collection and sending module in the dedicated functional unit needs to be provided with a logical interface connected to the shared memory, and a memory state flag bit needs to be added in the shared memory to indicate the state of current data information. Thus, the design complexity of connection interfaces of the shared memory is in direct proportion to the number of the interfaces, that is, the greater the number of the interfaces is, the more complex the design is. Further, the state flag bit added in the shared memory occupies the memory space, which reduces of the effective memory space, particularly, when there are multiple data transceiving modules in the dedicated functional units, and when the amount of data to be transceived is large, the added logic will be more complex. In addition, as the processor needs to determine the state of data in the current memory space according to the memory state flag bit, a large amount of additional logical consumption is introduced, resulting in reduced data efficiency.

SUMMARY

The embodiments of the present disclosure provide a method and an apparatus for an embedded processor to perform fast data communication.

Some embodiments of the present disclosure provide a method for an embedded processor to perform fast data communication, the method comprising:

dividing an internal memory into multiple on-chip storage units which are sequentially assigned with consecutive addresses, wherein read and/or write operations between different on-chip storage units are independent of each other and are able to be performed simultaneously;

configuring a memory interface controller connected to the internal memory, the memory interface controller comprising multiple memory interface control units, wherein each memory interface control unit corresponds to at least one on-chip storage unit, and each on-chip storage unit uniquely corresponds to one memory interface control unit;

configuring an on-chip processor and a Direct Memory Access (DMA) controller which are respectively connected to the memory interface controller, the DMA controller comprising multiple request allocation units in one-to-one correspondence with the memory interface control units, wherein an address corresponding to request information processed by each request allocation unit matches an address range of the on-chip processor, and the address corresponding to the request information processed by each request allocation unit matches an address of the on-chip storage unit which corresponds to the request allocation unit via the memory interface control unit;

configuring a dedicated functional module connected to the DMA controller, the dedicated functional module comprising multiple data collection units and multiple data reception units, wherein the on-chip processor is adapted to configure an address range of a memory corresponding to the dedicated functional module, and each data collection unit or data reception unit in the dedicated functional module is connected to each of the multiple request allocation units; and in a case where the on-chip processor executes a read and/or write request on the internal memory, the memory interface control unit matching a corresponding on-chip storage unit, so as to read and/or write data in the internal memory, and returning the read data to an original request module; and/or in a case where the dedicated functional module executes a read and/or write request on the internal memory through the DMA controller, the DMA controller connecting the corresponding memory interface controller according to a requested address, and the memory interface control unit matching a corresponding on-chip storage unit, so as to read and/or write data in the internal memory, and returning the read data to an original request module.

As a further improvement of some embodiments of the present disclosure, in the case where the dedicated functional module executes the read and/or write request on the internal memory through the DMA controller, the method further comprises: parsing the request information to obtain an address carried in the request information, and performing matching according to the address obtained through parsing to obtain a request allocation unit matching the request information.

As a further improvement of some embodiments of the present disclosure, in the case where the dedicated functional module executes the read and/or write request on the internal memory through the DMA controller, the method comprises: parsing the request information to obtain an address carried in the request information, and querying each request allocation unit according to the address obtained through parsing to determine whether the address carried in the parsed request information belongs to an address range scheduled by the current request allocation unit, in a case where the address carried in the parsed request information belongs to the address range scheduled by the current request allocation unit, the current request allocation unit responding to the parsed request information, and performing specific response to the request information on a corresponding on-chip storage unit through the memory interface control unit connected to the current request allocation unit.

As a further improvement of some embodiments of the present disclosure, the method further comprises: pre-configuring priority levels and/or processing weights of request information, and in a case where any interface control unit and/or any request allocation unit simultaneously receive multiple pieces of request information, processing the multiple pieces of request information in sequence according to the priority levels and/or processing weights of the respective pieces of request information; wherein the multiple pieces of request information are processed in sequence according to a descending order of the priority levels, and/or the multiple pieces of request information are cyclically scheduled according to the processing weights.

As a further improvement of some embodiments of the present disclosure, after the DMA controller confirms that the on-chip storage unit has completed processing an instruction carried in the request information, the method further comprises updating state flag information of a local register and generating an interrupt signal, and sending the interrupt signal to the on-chip processor.

As a further improvement of some embodiments of the present disclosure, that the on-chip storage unit has completed processing the instruction carried in the request information comprises: the on-chip storage unit has completed processing a data operation of at least one descriptor.

As a further improvement of some embodiments of the present disclosure, the method further comprises: setting a timeout mechanism, and in a case where the DMA controller confirms that sufficient data processing is not completed within a predetermined time period, triggering, by using the timeout mechanism, to update the state flag information of the local register and generate the interrupt signal.

As a further improvement of some embodiments of the present disclosure, the method further comprises: configuring an Error Checking and Correction (ECC) logic unit at an entry of each on-chip storage unit;

in a case where a write data width included in a write operation executed by the ECC logic unit is consistent with a storage width of the on-chip storage unit, directly calculating an ECC check code according to an ECC algorithm, and writing the ECC check code together with original write data into the corresponding on-chip storage unit;

in a case where the write data width included in the write operation executed by the EEC logic unit is less than the storage width of the on-chip storage unit, reading the original data from the corresponding on-chip storage unit, and after part of the original data that needs to be updated is modified, calculating an ECC check code according to the whole data after the update, and writing the ECC check code together with the modified data into the corresponding on-chip storage unit; and in a case where a read operation is executed, automatically detecting whether the read data has an error according to an error detection algorithm, and recording an error state into a corresponding register.

Some embodiments of the present disclosure provide an apparatus for an embedded processor to perform fast data communication, the apparatus comprising:

an internal memory, wherein the internal memory is divided into multiple on-chip storage units which are sequentially assigned with consecutive addresses, and read and/or write operations between different on-chip storage units are independent of each other and are able to be performed simultaneously;

a memory interface controller connected to the internal memory, the memory interface controller comprising multiple memory interface control units, wherein each memory interface control unit corresponds to at least one on-chip storage unit, and each on-chip storage unit uniquely corresponds to one memory interface control unit;

an on-chip processor and a Direct Memory Access (DMA) controller which are respectively connected to the memory interface controller, the DMA controller comprising multiple request allocation units in one-to-one correspondence with the memory interface control units, wherein an address corresponding to request information processed by each request allocation unit matches an address range of the on-chip processor, and the address corresponding to the request information processed by each request allocation unit matches an address of the on-chip storage unit which corresponds to the request allocation unit via the memory interface control unit; and a dedicated functional module connected to the DMA controller, the dedicated functional module comprising multiple data collection units and multiple data reception units, wherein the on-chip processor is adapted to configure an address range of a memory corresponding to the dedicated functional module, and each data collection unit or data reception unit in the dedicated functional module is connected to each of the multiple request allocation units;

wherein in a case where the on-chip processor executes a read and/or write request on the internal memory, the memory interface control unit matches a corresponding on-chip storage unit, so as to read and/or write data in the internal memory, and returns the read data to an original request module; and/or in a case where the dedicated functional module executes a read and/or write request on the internal memory through the DMA controller, the DMA controller connects the corresponding memory interface controller according to a requested address, and the memory interface control unit matches a corresponding on-chip storage unit, so as to read and/or write data in the internal memory, and returns the read data to an original request module.

Some embodiments of the present disclosure provide a computer-readable storage medium on which a computer program is stored, and when the computer program is executed by a processor, the operations of the method for an embedded processor to perform fast data communication as described above are implemented.

Compared with the related art, the beneficial effects of the embodiments of the present disclosure are discussed as follows. In the method and apparatus for an embedded processor to perform fast data communication, and a storage medium in the embodiments of the present disclosure, an internal memory of the system is divided into multiple on-chip storage units, concurrent data processing capability can be provided, and the data processing bandwidth is increased. Moreover, the data transceiving processing is completed by the DMA controller, and the on-chip processor only participates in a small amount of processing, thereby reducing the burden of the on-chip processor.

DETAILED DESCRIPTION OF THE EMBODIMENTS

Hereinafter, some embodiments of the present disclosure will be described in detail with reference to the exemplary embodiments shown in the accompanying drawings. However, these embodiments do not limit some embodiments of the present disclosure, and structures, methods, or functional changes made by a person of ordinary skill in the art according to these embodiments are included in the scope of protection of some embodiments of the present disclosure.

Figure 1:
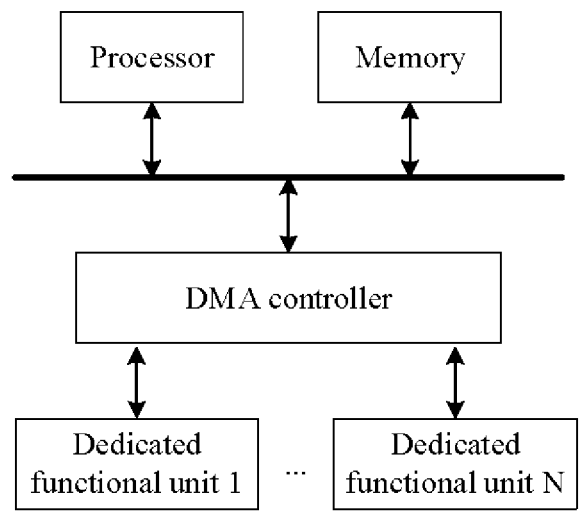
FIGS. 1 and 2 are schematic diagrams of frame structures of apparatuses for an embedded processor to perform fast data communication according to different implementations provided in the Background of the present disclosure.
Figure 2:
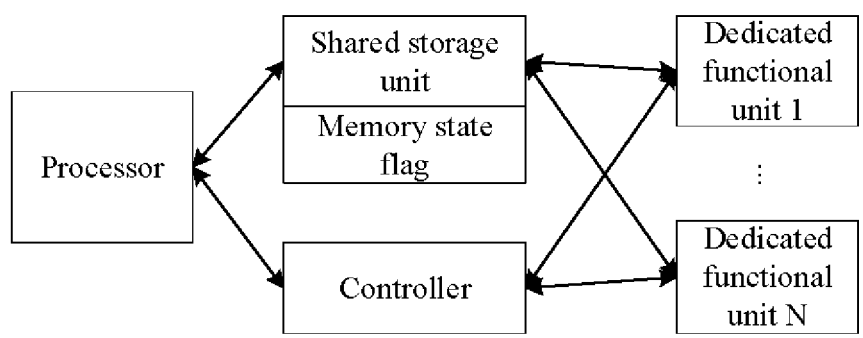
Figure 3:
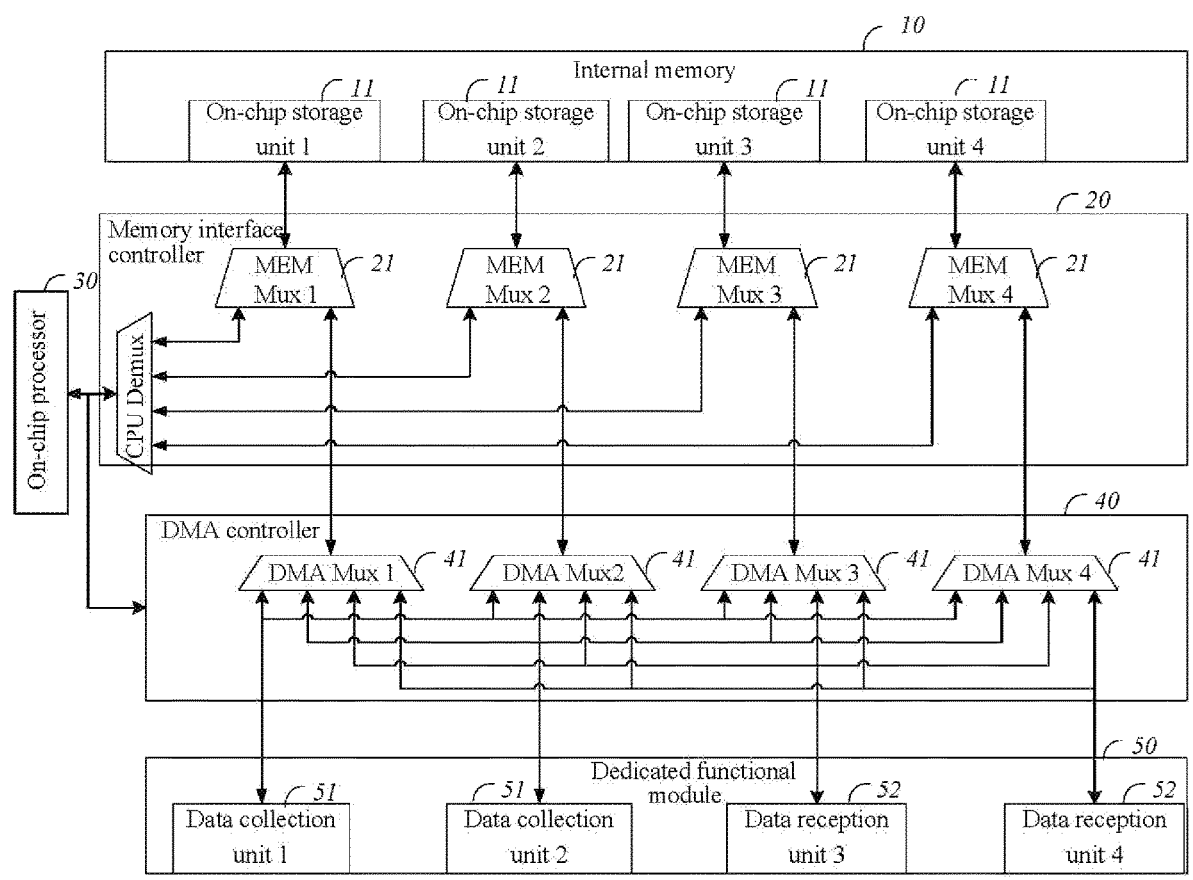
FIG. 3 is a schematic diagram of frame modules of an apparatus for an embedded processor to perform fast data communication provided according to some embodiments of the present disclosure.

As shown in FIG. 3, an apparatus for an embedded processor to perform fast data communication provided according to some embodiments of the present disclosure comprises: an internal memory 10, the internal memory 10 being divided into multiple on-chip storage units 11 which are sequentially assigned with consecutive addresses, wherein read and/or write operations between different on-chip storage units 11 are independent of each other and are able to be performed simultaneously; a memory interface controller 20 connected to the internal memory 10, the memory interface controller 20 comprising multiple memory interface control units 21, wherein each memory interface control unit 21 corresponds to at least one on-chip storage unit 11, and each on-chip storage unit 11 uniquely corresponds to one memory interface control unit 21; an on-chip processor 30 and a DMA controller 40 which are respectively connected to the memory interface controller 20, the DMA controller 40 comprising multiple request allocation units 41 in one-to-one correspondence with the memory interface control units 21, wherein an address corresponding to request information processed by each request allocation unit 41 matches an address range of the on-chip processor 30, and the address corresponding to the request information processed by each request allocation unit 41 matches an address of the on-chip storage unit 11 which corresponds to the request allocation unit via the memory interface control unit 21; and a dedicated functional module 50 connected to the DMA controller 40, the dedicated functional module 50 comprising multiple data collection units 51 and multiple data reception units 52, wherein the on-chip processor 30 is adapted to configure an address range of a memory corresponding to the dedicated functional module 50, and each dedicated functional module 50 is connected to each request allocation unit 41. In a case where the on-chip processor 30 executes a read and/or write request on the internal memory 10, and/or in a case where the dedicated functional module 50 executes a read and/or write request on the internal memory 10 through the DMA controller 40, the DMA controller 40 connects the memory interface controller 20 according to the requested address, and the memory interface control unit 21 queries a corresponding on-chip storage unit 11, so as to read and/or write data in the internal memory, and returns the read data to an original request module.

Figure 4:
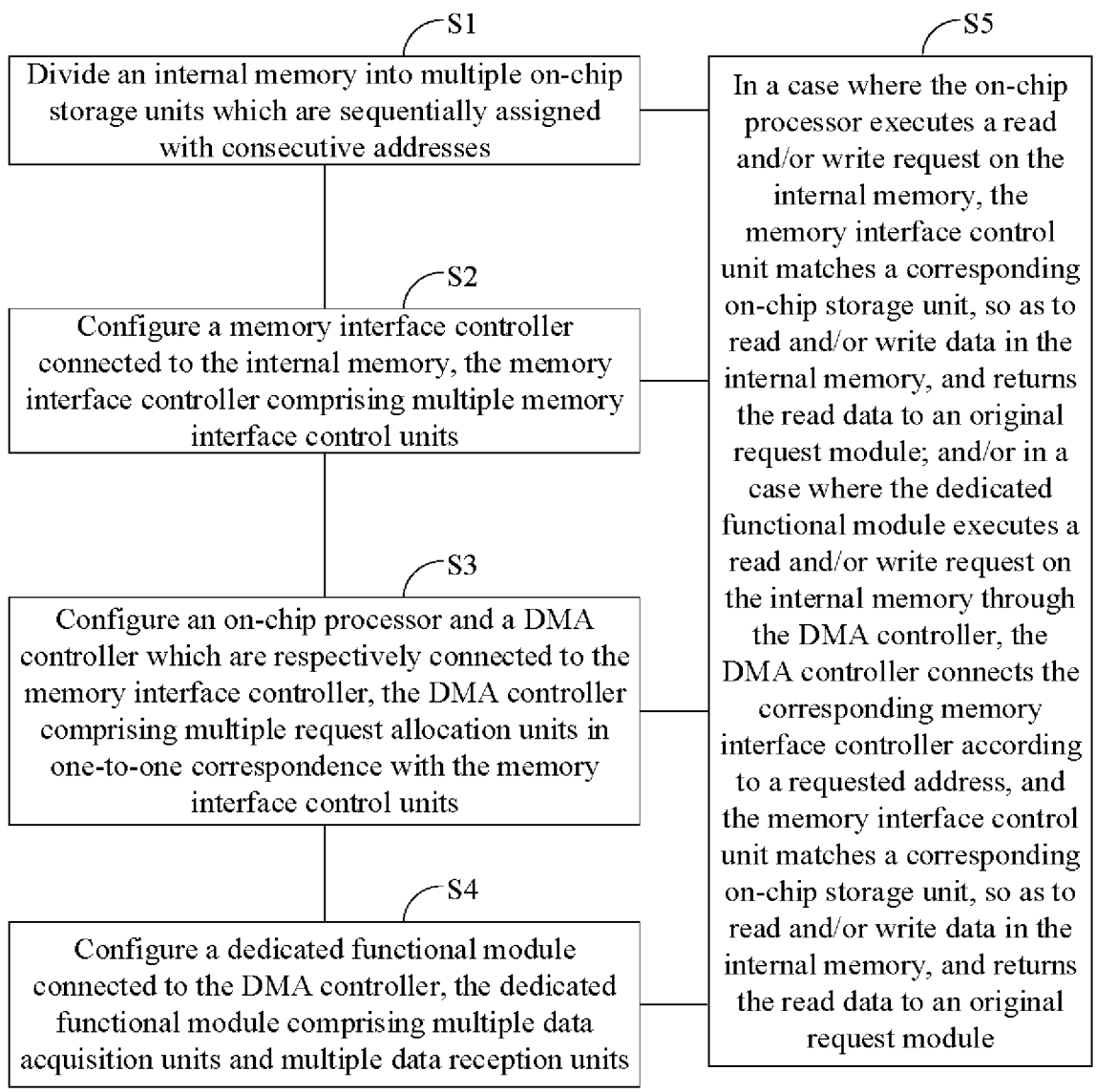
FIG. 4 is a schematic flowchart diagram of a method for an embedded processor to perform fast data communication provided according to some embodiments of the present disclosure.

In conjunction with FIG. 4, some embodiments of the present disclosure provide a method for an embedded processor to perform fast data communication, and the method refers to the apparatus for an embedded processor to perform fast data communication, and modules and units in the apparatus are described in detail.

In exemplary embodiments of the present disclosure, the method comprises:

S1, dividing an internal memory into multiple on-chip storage units which are sequentially assigned with consecutive addresses, wherein read and/or write operations between different on-chip storage units are independent of each other and are able to be performed simultaneously;

S2, configuring a memory interface controller connected to the internal memory, the memory interface controller comprising multiple memory interface control units, wherein each memory interface control unit corresponds to at least one on-chip storage unit, and each on-chip storage unit uniquely corresponds to one memory interface control unit;

S3, configuring an on-chip processor and a DMA controller which are respectively connected to the memory interface controller, the DMA controller comprising multiple request allocation units in one-to-one correspondence with the memory interface control units, wherein an address corresponding to request information processed by each request allocation unit matches an address range of the on-chip processor, and the address corresponding to the request information processed by each request allocation unit matches an address of the on-chip storage unit which corresponds to the request allocation unit via the memory interface control unit;

S4, configuring a dedicated functional module connected to the DMA controller, the dedicated functional module comprising multiple data collection units and multiple data reception units, wherein the on-chip processor is adapted to configure an address range of a memory corresponding to the dedicated functional module, and each data collection unit or data reception unit in the dedicated functional module is connected to each of the multiple request allocation units; and S5, in a case where the on-chip processor executes a read and/or write request on the internal memory, the memory interface control unit matching a corresponding on-chip storage unit, so as to read and/or write data in the internal memory, and returning the read data to an original request module; and/or in a case where the dedicated functional module executes a read and/or write request on the internal memory through the DMA controller, the DMA controller connecting the corresponding memory interface controller according to a requested address, and the memory interface control unit matching a corresponding on-chip storage unit, so as to read and/or write data in the internal memory, and returning the read data to an original request module.

It should be noted that in some embodiments of the present disclosure, a memory interface controller and a dedicated DMA controller are provided between the on-chip processor and the on-chip dedicated functional module, so as to achieve fast and efficient data communication between the on-chip dedicated functional module and the on-chip processor. The reference numerals S1 to S5 are merely numerals for convenience of description. In practical applications, the operations of the reference numerals S1 to S4 may be simultaneously performed or the sequence of the operations of the reference numerals S1 to S4 may be adjusted, and the arrangement of the sequence does not affect the data output result.

Regarding operation S1, the internal memory is divided into multiple on-chip storage units, and each on-chip storage unit is connected to a unique memory interface control unit. In this way, read and/or write operations between the on-chip storage units are independent of each other and are able to be performed simultaneously. In exemplary embodiments of the present disclosure, the on-chip storage units are addressed in a sequential manner.

Regarding operation S2, the memory interface control units are responsible for receiving requests for reading and/or writing the internal memory sent by the on-chip processor and the DMA controller, reading and/or writing data in the internal memory according to the requested address, and returning the read data to an original request module. The configured number of the memory interface control units can be specifically set according to requirements, and the set number of the memory interface control units is generally less than or equal to the number of the on-chip storage units, that is, each memory interface control unit can operate at least one on-chip storage unit. For example, in a case where the number of the memory interface control units is the same as the number of the on-chip storage units, one-to-one configuration is performed; and in a case where the number of the on-chip storage units is greater than the number of the memory interface control units, while performing one-to-one configuration, redundant on-chip storage units are configured to the same memory interface control unit or configured to multiple on-chip storage units.

Regarding operation S3, data collection units in the DMA controller are responsible for collecting data to be sent, forwarding the data into a corresponding memory interface control unit according to the address specified by the on-chip processor for the data to be sent, and further querying a corresponding on-chip storage unit through the memory interface control unit, and writing the data into the corresponding on-chip storage unit. Moreover, the DMA controller writes the read data from the on-chip storage unit into a designated data reception unit according to the configuration of the on-chip processor. In this implementation, the configured number of the request allocation units is the same as the number of the memory interface control units, each request allocation unit is connected to each unit in the dedicated functional module, that is, each request allocation unit can receive data collected by any one data collection unit, or can return the result of the read request to any one data reception unit. In general, the number of the request allocation units is less than or equal to a sum of the number of the data collection units and the number of the data reception units. However, in practical applications, each request allocation unit can receive request information of any one dedicated functional module, but according to the specifically divided address range of each request allocation unit, the request allocation unit only responds, according to address division, to an access request of an address range of the on-chip storage unit corresponding to the request allocation unit. As described above, the on-chip storage units are connected to the request allocation units through the memory interface control units, and the number of the request allocation units and the number of the on-chip storage units can be increased or reduced according to requirements, and the change of the requirement depends on the balance between the performance requirements and the logical design complexity of the whole system. Each request allocation unit may correspond to one or more on-chip storage units, the reason lies in that these on-chip storage units are logically independent, and the read and/or write by the request allocation units on the data inside the on-chip storage units are also independent of one another. Correspondingly, the greater the number of the on-chip storage units, the higher the supported data processing bandwidth. However, the greater the number of the on-chip storage units, the more complex the logical design, thereby increasing the chip cost. The number of the data collection units and the data reception units is generally greater than the number of the request allocation units. When designing address assignment of a system, a data collection unit or data reception unit with a large amount of data operations is configured to individually occupy a request allocation unit; while other data collection units or data reception units with only occasional data operations may share one request allocation unit. Such a design can ensure the system performance while simplifying the complexity of the logical design.

Operation S5 is a specific operation flow of data. In practical applications, the request information is from the on-chip processor or the DMA controller, and the memory interface controller first allocates, to memory interface control units corresponding to designated on-chip storage units, read and/or write requests for the internal memory sent from the on-chip processor and the DMA controller. After receiving these read and/or write requests, if the requests are read requests, the memory interface control units need to return the read data according to the requested source (the on-chip processor or DMA controller); and if the requests are write requests, the memory interface control units write the requested data into the corresponding on-chip storage units.

It should be noted that for the memory interface control units and the request allocation units, the requests received by the memory interface control units and the request allocation units at the same time may involve multiple services affecting one another. In exemplary embodiments of the present disclosure, the method further comprises setting an appropriate arbitration principle for each type of request information. Specifically, as an implementation, priority levels and/or processing weights of request information are pre-configured, and in a case where any interface control unit and/or any request allocation unit simultaneously receive multiple pieces of request information, the multiple pieces of request information are processed in sequence according to the priority levels and/or processing weights of the respective pieces of request information. For example, the multiple pieces of request information are processed in sequence according to a descending order of the priority levels, and/or the multiple pieces of request information are cyclically scheduled according to the processing weights.

In exemplary embodiments of the present disclosure, during data exchange, in the case where the dedicated functional module executes the read and/or write request on the internal memory through the DMA controller, the method further comprises: parsing the request information to obtain an address carried in the request information, and performing matching according to the address obtained through parsing to obtain a request allocation unit matching the request information. In exemplary embodiments of the present disclosure, in the case where the dedicated functional module executes the read and/or write request on the internal memory through the DMA controller, the method comprises: parsing the request information to obtain an address carried in the request information, and querying each request allocation unit according to the address obtained through parsing to determine whether the address carried in the parsed request information belongs to an address range scheduled by the current request allocation unit, in a case where the address carried in the parsed request information belongs to the address range scheduled by the current request allocation unit, the current request allocation unit responding to the parsed request information, and performing specific response to the request information on a corresponding on-chip storage unit through the memory interface control unit connected to the current request allocation unit.

In exemplary embodiments of the present disclosure, after the DMA controller confirms that the on-chip storage unit has completed processing an instruction carried in the request information, the method further comprises updating state flag information of a local register and generating an interrupt signal, and sending the interrupt signal to the on-chip processor. For example, after the DMA controller confirms that the data is written into a designated on-chip storage unit by the memory interface control unit, state flag information of a local register is updated and an interrupt signal is generated, so as to notify the on-chip processor that the current data has been processed.

In general, each piece of data generally has a corresponding descriptor, and when the operation of the descriptor is completed, it can be considered that data processing is completed, and thus, in exemplary embodiments of the present disclosure, that the on-chip storage unit has completed processing the instruction may be: the on-chip storage unit has completed processing a data operation of at least one descriptor. That is, according to specific requirements, it can be configured that after completing data operations of one or more descriptors, the state flag of the local register is modified and a corresponding interrupt signal is generated. The configuration mode of one descriptor can ensure that a data transmission state is notified to the on-chip processor in time; and the configuration mode of multiple descriptors can ensure that the on-chip processor is not frequently interrupted, so as to ensure normal processing of other application programs. These two configuration modes can be respectively used in two different situations, i.e., a scenario with small amount of data and a scenario with large amount of data.

In exemplary embodiments of the present disclosure, in order to ensure the situation of temporary interruption during data transmission, the method further comprises: setting a timeout mechanism, and in a case where the DMA controller confirms that sufficient data processing is not completed within a predetermined time period, triggering, by using the timeout mechanism, to update the state flag information of the local register and generate the interrupt signal.

In addition, in exemplary embodiments of the present disclosure, ECC configuration is performed on the system to achieve an ECC selectable function. The ECC is an abbreviation for Error Checking and Correction. Specifically, the method further comprises: configuring an ECC logic unit at an entry of each on-chip storage unit; in a case where a write data width included in a write operation executed by the ECC logic unit is consistent with a storage width of the on-chip storage unit, directly calculating an ECC check code according to an ECC algorithm, and writing the ECC check code together with original write data into the corresponding on-chip storage unit; in a case where the write data width included in the write operation executed by the EEC logic unit is less than the storage width of the on-chip storage unit, reading the original data from the corresponding on-chip storage unit, and after part of the original data that needs to be updated is modified, calculating an ECC check code according to the whole data after the update, and writing the ECC check code together with the modified data into the corresponding on-chip storage unit; and in a case where a read operation is executed, automatically detecting whether the read data has an error according to an error detection algorithm, and recording an error state into a corresponding register.

In specific applications of some embodiments of the present disclosure, when configuring to support an ECC function, an ECC logic unit is enabled in a corresponding memory interface controller. The ECC logic unit is divided into two operations of read and write for processing. For operations in which a write data width included in a write operation is consistent with a storage width of the on-chip storage unit, and for operations of reading data, after the ECC logic unit is enabled, the fault tolerance for data can be improved without causing any loss of performance.

However, in a case where the write data width included in the write operation executed by the EEC logic unit is less than the storage width of the on-chip storage unit, then it indicates that the current write operation only needs to update part of the data in a designated address in the internal memory. In this case, in order to ensure that the write operation does not affect the original data, a read-modify-write operation needs to be performed, that is, original data is read from the corresponding on-chip storage unit, and after part of the original data that needs to be updated is modified, an ECC check code is calculated according to the whole data after the update, and written into the corresponding on-chip storage unit together with the modified data. In this way, the read-modify-write operation only needs to be executed when the write data width is inconsistent with the storage width of the on-chip storage unit, and the effect on top-down logic is merely that the processing delay becomes long, which does not affect the normal function thereof and does not need to be modified.

In conjunction with FIG. 3, in specific examples of the present disclosure, the internal memory is consecutively divided into four on-chip storage units according to addresses. In this example, the four on-chip storage units are respectively represented as an on-chip storage unit 1, an on-chip storage unit 2, an on-chip storage unit 3, and an on-chip storage unit 4. Correspondingly, the on-chip processor can configure an address range of each on-chip storage unit. In this example, the address ranges corresponding to the four on-chip storage units are respectively: 0x0000-0x3FFF, 0x4000-0x7FFF, 0x8000-0xBFFF, and 0xC000-0xFFF.

The number of the memory interface control units is set to be equal to the number of the on-chip storage units, and the memory interface control units and the on-chip storage units are configured to be connected in one-to-one correspondence, and the four memory interface control units are respectively represented as MEM Mux1, MEM Mux2, MEM Mux3 and MEM Mux4.

The number of the request allocation units is set to be equal to the number of the memory interface control units, and the request allocation units and the memory interface control units are configured to be connected in a one-to-one correspondence configuration, and the four request allocation units are respectively represented as DMA Mux1, DMA Mux2, DMA Mux3, and DMA Mux4. Here, it should be noted that an address corresponding to request information processed by each request allocation unit necessarily matches an address range configured by the on-chip processor for each on-chip storage unit. Moreover, the four request allocation units are connected to each unit of the dedicated functional module. In this specific example, the dedicated functional module comprises two data collection units and two data reception units, which are respectively a data collection unit 1 and a data collection unit 2, and a data reception unit 1 and a data reception unit 2.

During data exchange, the on-chip processor configures address ranges corresponding to respective data collection units and data reception units, and when any data collection unit and/or data reception unit receives request information, the data collection unit and/or data reception unit sends the request information to the DMA controller. In addition, each request allocation unit DMA Mux in the DMA controller can receive the request information, and determine, according to an address included in the request information, an address range of which request allocation unit the request information matches; and if a specific request allocation unit is matched, the request allocation unit schedules the current request information, and if no specific request allocation unit is matched, the request information is not responded. For example, when the address information included in the current request information falls in the address range 0x0000-0x3FFF, the request is processed by DMA Mux1, otherwise, DMA Mux1 does not respond to the request information.

Further, if multiple pieces of request information need to be processed simultaneously in DMA Mux1, processing is performed according to arbitration principles of the multiple requests, and in general, the priority of a request requiring emergent processing is high. In addition, when the priorities of the multiple requests are the same, cyclic scheduling may be performed by using weights, which is not further described herein. The ultimate goal of the setting of the arbitration principles is to ensure that the practical application requirements can be satisfied and the logical design is simple.

Further, after the memory interface controller receives a data operation request from the DMA controller, the data operation request is allocated to a corresponding memory interface control unit according to the address for processing; in addition, a data operation request of the on-chip processor is also sent to a corresponding memory interface control unit according to the address for processing. If the address included in the request information of the current on-chip processor is also 0x0000-0x3FFF while the data processed by DMA Mux1 is sent to the memory interface control unit MEM Mux1, the request is together sent to the memory interface control unit MEM Mux1 for receiving and processing, and at this time, the data from the on-chip processor and the request allocation unit is selected by using the arbitration principles, and then are processed in sequence; further, the finally selected request will operate the data in the on-chip storage unit 1; and a write operation directly writes the data into the on-chip storage unit 1, and a read operation reads the data at an address corresponding to the on-chip storage unit 1 and then returns the data to the on-chip processor or the DMA controller.

The solution of the embodiments of the present disclosure is applicable to fast and efficient data exchange processing between an embedded on-chip processor and the on-chip dedicated functional module, and on the basis of the balance of performance and design complexity, the number of memory division of the system can be set, that is, the number of the on-chip functional units and the number of request allocation units in the DMA controller can be set. It should be noted that while ensuring that the performance meets the requirements, the smaller the number of the units, the simpler the logic implementation. Correspondingly, on the basis of the implementation solutions of the embodiments of the present disclosure, the on-chip processor is only responsible for processing a small amount of control information (such as DMA and interruption), and the specific data transceiving process is autonomously achieved by on-chip logic. Moreover, due to the flexible division manner of the memory of the system and the arbitration manner of data transceiving requests, the efficient data processing effect can be achieved.

In summary, in the method and apparatus for an embedded processor to perform fast data communication, and a storage medium in the embodiments of the present disclosure, an internal memory of the system is divided into multiple on-chip storage units, concurrent data processing capability can be provided, and the data processing bandwidth is increased. Moreover, the data transceiving processing is completed by the DMA controller, and the on-chip processor only participates in a small amount of processing, thereby reducing the burden of the on-chip processor. Further, the data transceiving processing is subjected to two-stage arbitration and selection, arbitration priority principles can be flexibly set, and the requirement of the overall system performance is satisfied by using a simple logic. In addition, in the embodiments of the present disclosure, by providing flexibly controllable ECC logic units, the upper and lower modules can support an ECC data protection function without modifying logic.

The system embodiments as described above are merely schematic, in which the modules described as separate components may or may not be physically separated, and the components displayed as modules are logic modules, that is, may be located in one module in a chip logic, or may be distributed to multiple data processing modules in the chip. Some or all of the modules may be selected according to actual requirements to achieve the purpose of the solution of the present embodiment. A person of ordinary skill in the art would understand and implement the embodiments without any inventive effort.

The present disclosure can be used in numerous general-purpose or special-purpose chip designs, for example, a switch chip, a router chip, a server chip, etc.

It should be understood that although the present description is illustrated according to the embodiments, not every embodiment comprises only one independent technical solution, the illustration manner of the description is merely for clarity, and a person of ordinary skill in the art should take the description as a whole, and the technical solutions in various embodiments can be combined properly to form other embodiments that could be understood by a person of ordinary skill in the art.

The series of detailed illustrations listed above are merely specific illustrations of feasible embodiments of the present disclosure, and they are not intended to limit the scope of protection of the embodiments of the present disclosure, and equivalent embodiments or modifications made without departing from the principle of the embodiments of the present disclosure should be included within the scope of protection of the embodiments of the present disclosure.

What is claimed is:

1. A method for an embedded processor in a System on a Chip (SoC) to perform fast data communication, wherein the method comprises:
   dividing an internal memory into multiple on-chip storage units which are sequentially assigned with consecutive addresses, wherein read or write operations between different on-chip storage units are independent of each other and are able to be performed simultaneously;
   enabling a memory interface controller connected to the internal memory, the memory interface controller comprising multiple memory interface control units, wherein each memory interface control unit corresponds to at least one on-chip storage unit, and each on-chip storage unit uniquely corresponds to one memory interface control unit;
   enabling an on-chip processor and a Direct Memory Access (DMA) controller which are respectively connected to the memory interface controller, the DMA controller comprising multiple request allocation units in one-to-one correspondence with the memory interface control units, wherein an address corresponding to request information processed by each request allocation unit matches an address range of the on-chip processor, and the address corresponding to the request information processed by each request allocation unit matches an address of the on-chip storage unit corresponding to the respective request allocation unit;
   enabling a dedicated functional module connected to the DMA controller, the dedicated functional module comprising multiple data collection units and multiple data reception units, wherein the on-chip processor is adapted to configure an address range of the internal memory corresponding to each of the multiple data collection units and the multiple data reception units, and each data collection unit and data reception unit in the dedicated functional module is connected to each of the multiple request allocation units; and
   when the on-chip processor executes a read or write request on the internal memory, the memory interface control unit determining a corresponding on-chip storage unit according to an address carried in the request information of the read or write request and sending the read or write request to the determined corresponding on-chip storage unit, so as to read or write data in the internal memory, and when data is read from the internal memory, returning the read data to an original request module; and when the dedicated functional module executes a read or write request on the internal memory through the DMA controller, the DMA controller sending the read or write request through the corresponding request allocation unit to the corresponding memory interface control unit according to an address carried in the request information of the read or write request, and the corresponding memory interface control unit determining a corresponding on-chip storage unit according to the address carried in the request information of the read or write request and sending the read or write request to the determined corresponding on-chip storage unit, so as to read or write data in the internal memory, and when data is read from the internal memory, returning the read data to an original request module.

2. The method for an embedded processor to perform fast data communication according to claim 1, wherein when the dedicated functional module executes the read or write request on the internal memory through the DMA controller, the method further comprises: parsing the request information to obtain the address carried in the request information, and determining a request allocation unit corresponding to the request information according to the address obtained through parsing.

3. The method for an embedded processor to perform fast data communication according to claim 2, wherein when the dedicated functional module executes the read or write request on the internal memory through the DMA controller, the method comprises: parsing the request information to obtain the address carried in the request information, and querying each request allocation unit according to the address obtained through parsing to determine whether the address carried in the parsed request information belongs to an address range scheduled by the current request allocation unit, when the address carried in the parsed request information belongs to the address range scheduled by the current request allocation unit, the current request allocation unit responding to the parsed request information, and executing the read or write on a corresponding on-chip storage unit through the memory interface control unit connected to the current request allocation unit.

4. The method for an embedded processor to perform fast data communication according to claim 1, wherein the method further comprises: pre-configuring priority levels and/or processing weights of request information, and when any interface control unit and/or any request allocation unit simultaneously receive multiple pieces of request information, processing the multiple pieces of request information in sequence according to the priority levels and/or processing weights of the respective pieces of request information.

5. The method for an embedded processor to perform fast data communication according to claim 4, wherein the multiple pieces of request information are processed in sequence according to a descending order of the priority levels, and/or the multiple pieces of request information are cyclically scheduled according to the processing weights.

6. The method for an embedded processor to perform fast data communication according to claim 1, wherein after the DMA controller confirms that the on-chip storage unit has completed processing an instruction carried in the request information, the method further comprises: updating state flag information of a local register and generating an interrupt signal, and sending the interrupt signal to the on-chip processor.

7. The method for an embedded processor to perform fast data communication according to claim 6, wherein when the on-chip storage unit has completed processing the instruction carried in the request information, the on-chip storage unit has completed processing a data operation of at least one descriptor.

8. The method for an embedded processor to perform fast data communication according to claim 6, wherein the method further comprises: setting a timeout mechanism, and when the DMA controller confirms that sufficient data processing is not completed within a predetermined time period, triggering, by using the timeout mechanism, to update the state flag information of the local register and generate the interrupt signal.

9. The method for an embedded processor to perform fast data communication according to claim 1, wherein the method further comprises: enabling an Error Checking and Correction (ECC) logic unit provided between each on-chip storage unit and the corresponding memory interface control unit.

10. The method for an embedded processor to perform fast data communication according to claim 9, wherein when a write data width included in a write operation executed by the ECC logic unit is consistent with a storage width of the on-chip storage unit, directly calculating an ECC check code according to an ECC algorithm, and writing the ECC check code together with original write data into the corresponding on-chip storage unit.

11. The method for an embedded processor to perform fast data communication according to claim 9, wherein when the write data width included in the write operation executed by the EEC logic unit is less than the storage width of the on-chip storage unit, reading original data from the corresponding on-chip storage unit, and after part of the original data that needs to be updated is modified, calculating an ECC check code according to the whole data after the update, and writing the ECC check code together with the modified data into the corresponding on-chip storage unit.

12. The method for an embedded processor to perform fast data communication according to claim 9, wherein when a read operation is executed, the method comprises: automatically detecting whether the read data has an error according to an error detection algorithm, and recording an error state into a corresponding register.

13. The method for an embedded processor to perform fast data communication according to claim 1, wherein when the number of the data collection units and the data reception units is greater than the number of the request allocation units,
    a data collection unit or data reception unit with a large amount of data operations is configured to individually occupy a request allocation unit; while data collection units or data reception units with only occasional data operations share one request allocation unit.

14. A non-transitory computer-readable storage medium on which a computer program is stored, wherein when the computer program is executed by a processor, the method for an embedded processor to perform fast data communication according to claim 1 is implemented.

15. An apparatus for an embedded processor in a System on a Chip (SoC) to perform fast data communication, wherein the apparatus comprises:
    an internal memory, wherein the internal memory is divided into multiple on-chip storage units which are sequentially assigned with consecutive addresses, and read or write operations between different on-chip storage units are independent of each other and are able to be performed simultaneously;
    a memory interface controller connected to the internal memory, the memory interface controller comprising multiple memory interface control units, wherein each memory interface control unit corresponds to at least one on-chip storage unit, and each on-chip storage unit uniquely corresponds to one memory interface control unit;
    an on-chip processor and a Direct Memory Access (DMA) controller which are respectively connected to the memory interface controller, the DMA controller comprising multiple request allocation units in one-to-one correspondence with the memory interface control units, wherein an address corresponding to request information processed by each request allocation unit matches an address range of the on-chip processor, and the address corresponding to the request information processed by each request allocation unit matches an address of the on-chip storage unit corresponding to the respective request allocation unit; and a dedicated functional module connected to the DMA controller, the dedicated functional module comprising multiple data collection units and multiple data reception units, wherein the on-chip processor is adapted to configure an address range of the internal memory corresponding to each of the multiple data collection units and the multiple data reception units, and each data collection unit and data reception unit in the dedicated functional module is connected to each of the multiple request allocation units;

wherein when the on-chip processor executes a read or write request on the internal memory, the memory interface control unit determines a corresponding on-chip storage unit according to an address carried in the request information of the read or write request and sends the read or write request to the determined corresponding on-chip storage unit, so as to read or write data in the internal memory, and when data is read from the internal memory, returns the read data to an original request module; and when the dedicated functional module executes a read or write request on the internal memory through the DMA controller, the DMA controller sends the read or write request through the corresponding request allocation unit to the corresponding memory interface control unit according to an address carried in the request information of the read or write request, and the corresponding memory interface control unit determines a corresponding on-chip storage unit according to the address carried in the request information of the read or write request and sends the read or write request to the determined corresponding on-chip storage unit, so as to read or write data in the internal memory, and when data is read from the internal memory, returns the read data to an original request module.

16. The apparatus for an embedded processor to perform fast data communication according to claim 15, further comprising: an Error Checking and Correction (ECC) logic unit between each on-chip storage unit and the corresponding memory interface control unit.

17. The apparatus for an embedded processor to perform fast data communication according to claim 16, wherein when a write data width included in a write operation executed by the ECC logic unit is consistent with a storage width of the on-chip storage unit, an ECC check code is directly calculated according to an ECC algorithm, and the ECC check code together with original write data are written into the corresponding on-chip storage unit.

18. The apparatus for an embedded processor to perform fast data communication according to claim 16, wherein when the write data width included in the write operation executed by the EEC logic unit is less than the storage width of the on-chip storage unit, original data is read from the corresponding on-chip storage unit, and after part of the original data that needs to be updated is modified, an ECC check code is calculated according to the whole data after the update, and the ECC check code together with the modified data are written into the corresponding on-chip storage unit.

19. The apparatus for an embedded processor to perform fast data communication according to claim 16, wherein when a read operation is executed, automatically detecting whether the read data has an error according to an error detection algorithm, and recording an error state into a corresponding register.

20. The apparatus for an embedded processor to perform fast data communication according to claim 15, wherein when the number of the data collection units and the data reception units is greater than the number of the request allocation units, a data collection unit or data reception unit with a large amount of data operations is configured to individually occupy a request allocation unit; while data collection units or data reception units with only occasional data operations share one request allocation unit.

* * * * *